(12) United States Patent
Nielsen et al.

(10) Patent No.: US 7,656,691 B2
(45) Date of Patent: Feb. 2, 2010

(54) CHARGE MODE CONTROL OF A SERIAL RESONANCE CONVERTER

(75) Inventors: Runo Nielsen, Tommerup (DK); Soren Kjaerulff Christensen, Struer (DK)

(73) Assignee: Bang & Olufsen A/S, Struer (DK)

( * ) Notice: Subject to any disclaimer, the term of this patent is extended or adjusted under 35 U.S.C. 154(b) by 224 days.

(21) Appl. No.: 10/595,706

(22) PCT Filed: Oct. 27, 2004

(86) PCT No.: PCT/DK2004/000740

§ 371 (c)(1),
(2), (4) Date: Dec. 29, 2006

(87) PCT Pub. No.: WO2005/046037

PCT Pub. Date: May 19, 2005

(65) Prior Publication Data

US 2007/0171679 A1  Jul. 26, 2007

(30) Foreign Application Priority Data

Nov. 6, 2003  (EP) .................................. 03025509

(51) Int. Cl.
*H02M 3/338* (2006.01)
(52) U.S. Cl. .......................... 363/79; 363/21.02; 363/16
(58) Field of Classification Search .................. 363/79, 363/16, 21.02, 80, 21.03; 323/288, 286
See application file for complete search history.

(56) References Cited

U.S. PATENT DOCUMENTS

| 4,935,857 | A | 6/1990 | Nguyen et al. | |
|---|---|---|---|---|
| 5,680,034 | A * | 10/1997 | Redl | 363/21.03 |
| 5,999,433 | A | 12/1999 | Hua et al. | |
| 6,046,914 | A * | 4/2000 | Lauter | 363/37 |
| 6,351,401 | B1 * | 2/2002 | Scheel et al. | 363/98 |
| 6,396,716 | B1 * | 5/2002 | Liu et al. | 363/17 |
| 6,449,172 | B2 * | 9/2002 | Nagahara | 363/25 |
| 6,711,034 | B2 | 3/2004 | Duerbaum et al. | |
| 2003/0043599 | A1 * | 3/2003 | Duerbaum et al. | 363/17 |

* cited by examiner

*Primary Examiner*—Harry Behm
(74) *Attorney, Agent, or Firm*—David S. Safran; Roberts Mlotkowski Safran & Cole, P.C.

(57) ABSTRACT

The present invention relates to an apparatus and a method for converting power from a power input to a DC output current or voltage, where a first feedback circuit a traditional feedback. The converter type is a resonant DC-DC converter. The scope of the invention is to reach a high effective and fast responding switch mode power supply. This can be achieved with an apparatus or method comprising a second feedback circuit leading a signal from a serial resonance capacitor(s) to a reference input terminal at the control circuit, which second feedback circuit contains a signal depending on the actual change in charge of the resonant capacitor(s). This means that at high load, a very powerful signal will be transmitted through the second feedback at the control circuit that will change the operation of the circuit into a charge mode operation. As the load on the output is reduced, the influence of the second feedback signal will be reduced, and the influence from the charge mode is reduced and the operation mode is changing back into a normal frequency mode of operation. In this way, a much more constant gain in the series or series parallel resonant DC-DC converter is achived, and therefore a much better regulated voltage or current of the resonant DC-DC converter can be made.

3 Claims, 6 Drawing Sheets

CHARGE MODE CONTROL OF A SERIAL RESONANCE CONVERTER

The present invention relates to an apparatus and a method for converting power from a power input to an DC output voltage or current, which apparatus comprises a serial resonance converter containing at least two serial coupled semiconductor switches having a common output terminal connected to at least one first coil which coil can be a part of a transformer having a second winding connected to a rectifier means, which rectifier means has its output connected to output terminals, where a first feedback circuit is connected from the output terminal to an error amplifier, which error amplifier is connected to an input at a control circuit, which output is connected over driver means to the input of the semiconductor switches, where the apparatus further comprises a second feedback circuit where the second feedback circuit is leading a signal from at least one capacitor, which capacitor is connected in serial to the first coil to an input terminal.

US2003/043599 describes a DC-DC converter, a regulation method for a DC-DC converter and a switched-mode power supply are proposed. The DC-DC converter comprises an inverter and a primary-side circuit with a transformer whose secondary-side voltage is rectified by at least one rectifier for generating an output DC voltage. To avoid an asymmetrical load, which is in particular exhibited by a different load of the rectifier elements (power semiconductors), an electrical magnitude of the DC-DC converter is measured. This magnitude may, for example, be a primary-side current, a primary-side voltage at a capacitance, or a secondary-side, rectified voltage. From the measurement of the magnitude, a parameter for the symmetry deviation is calculated for which different symmetry measuring methods are proposed. A symmetry regulation arrangement utilizes the drive of the inverter, for example, the duty cycle of the pulse width modulated voltage produced by the inverter to minimize the parameter for the symmetry deviation. This achieves an even distribution of the power over the secondary rectifier elements.

The above mentioned document describes regulation of the switching frequency to keep it clearly above the resonant frequency of the resonant arrangement. The circuit is operating in frequency mode, which leads to unlinearity in the relation between output voltage and output power. The focus in the above mentioned patent application is to avoid an asymmetrical load of the rectifying components, whereas the actual invention is to optimize the output stability by linearizing the feedback.

U.S. Pat. No. 4,935,857 describes a DC to DC series-parallel resonant converter (10) having a plurality of switches (Q1-Q4) which are switched alternatively between on and off states to cause electrical current to flow alternatively in first and second directions through a series-resonant circuit (60) including a variable frequency ramp generator (28) having a reset input (R) for causing an output ramp signal produced at an output to drop to zero in response to each reset signal; a comparator (30) having an input coupled to the output of the ramp signal generator, a second input for controlling the output DC voltage of the series-parallel resonant circuit and an output which changes level each time the ramp signal reaches the magnitude of the second input; a bistable circuit (32) having first and second outputs (Q, Q) for respectively outputting first and second signals, the output signals changing in response to a change in the output signal of the comparator coupled to the input; a pulse generator (26), coupled to the series-parallel resonant circuit for producing an output pulse train with an output pulse occurring each time the flow of current through the series-resonant circuit changes from one of the first and second directions to another of the first and second directions, the output pulses being applied to the reset input of the variable frequency ramp generator to regulate the frequency of the output ramp signal.

The focus in the above mentioned patent is to assure that the switching frequency of the converter is held above the resonance frequency of the serial/parallel converter.

In an apparatus as described in the opening paragraph it is known to use an integrated circuit L6598 or similar. This integrated circuit comprises a current controlled oscillator which output is connected over driver means to two inverse output terminals, which are directly connectable to the input of semiconductor switches. The oscillator part in L6598 is also connected to the outside through a connecting terminal where this terminal is connected to an external capacitor that together with two internal current controlled current generators set the frequency. An input signal at the integrated circuit is so connected that changes in current through this terminal lead to control of the frequency. It is achieved that the voltage over the connected capacitor is changing in a linear way between two voltage situations. Each time the charge of the capacitor changes its sign in charge current, the oscillator changes its output from a first to a second value, which over the drivers activates and/or deactivates the semiconductor switches. A feedback from the power output is used to control the size of the current used to charge or discharge the capacitor and, thereby, to a change in the frequency of an oscillating system form by extern components. The oscillating frequency is in normal operation oscillating over the resonance frequency of the resonant DC-DC converter, where the first feedback signal leads to a frequency change to a lower frequency nearer the resonance frequency if a higher load is needed. As normal series resonant converter function working above resonant with frequency control, see FIG. 5a.

Figure 4:
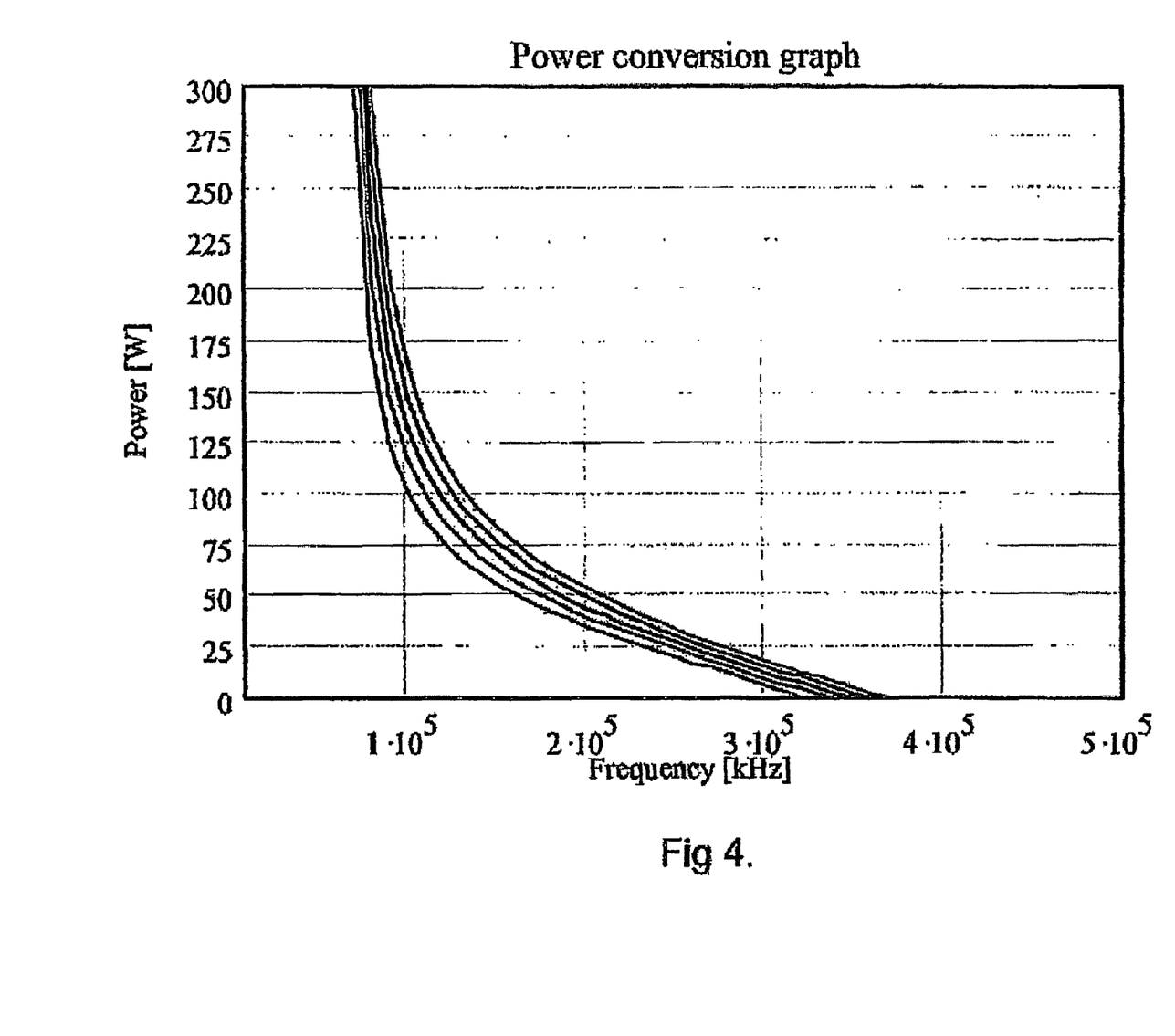
FIG. 4 shows a typical power conversion of a series resonance converter.

When using resonant converters close to resonance frequency, the power gain in the DC-DC converter is highly unlinear with gives big problems in design of the first feedback loop. FIG. 4.

The scope of the invention is to improve and stabilize an output voltage or current having a fast response to a change in load by linearization of the power conversion control in the resonance DC-DC converter, see FIG. 5c.

This can be achieved with an apparatus or method if modified so that the second feedback circuit is connected to the input terminal of the control circuit, which input terminal is connected to at least one capacitor, which capacitor is controlling the switching frequency, which second feedback circuit comprises a signal depending on the actual change of the charge over the serial resonance capacitor in each half period of switching, which linearizes the influence of the first feedback circuit.

In this way, it can be achieved that the oscillating frequency is under influence of the signal that depends on the voltage at the capacitor(s), Cp,Cp', connected in serial to the coil or transformer. Capacitor Cp and Cp' can be used alone or together, but this will not influence the main function of the circuit. The voltage at the capacitor(s) connected to the first coil or transformer depends on the current flowing through the output of the power supply. This means that at high load, a very powerful signal will be transmitted directly to the input at the oscillator pin in the control circuit. This will change the operation of the circuit into a charge mode operation. As the load on the output is reduced, the influence of the second feedback signal will be reduced, and the influence of the charge mode is reduced and the operation mode changes back into a normal frequency mode of operation. At the start-up of the power supply, there will be no signal at the second feedback circuit, and the whole start-up will take place in normal frequency mode.

With charge mode control, the second feedback loop measures and controls how much charge that is flowing through the resonance capacitor(s) in each half period of switching. This charge is much more linear dependant to power than frequency. The fact that the change in charge instead of current and frequency is controlled is an important feature. In FIG. 5a, an example of normal frequency control is seen without a second feedback loop. If charge mode control by adding a second loop, 50, is used, FIG. 5b shows that the curve is linearized at higher load, but there are still some problems at low load. By using a combination of frequency control and charge mode control, this can be solved, see FIG. 5c.

The second feedback. circuit can be connected from the serial resonance capacitor(s) 13,19, connected to the coil or transformer through at least one further capacitor where at least one further capacitor is connected to an earth connection. In this way, a reduction of the voltage of the feedback signal can be achieved. The degree of influence can be adjusted by changing the size of the two capacitors, hereby, it can be achieved that the change of operation mode starts its influence on demand, which is defined from the size of the capacitors. The output of the one or two capacitors can be connected to the input terminal of the oscillator part of the control circuit through at least one capacitor and resistor. Hereby, it can be achieved that the signal of the second feedback circuit is reduced to a value that can be used effectively to influence the charging and discharging of the capacitor connected to the oscillator part in the control circuit. This can be important in the design of new power supplies in that a very simple change of a component at a printed circuit board leads to a major change in function of the power supply.

Together with L6598 or similar circuits the second feedback needs an extra circuit. It contains an inverting amplifier, which output can be connected to the input terminal of the oscillator part through at least one capacitor and one resistor. Hereby, it can be achieved that the signal of the second feedback is inverted and amplified to a value that can be used effectively to influence the charging and discharging of the capacitor connected to the oscillator pin on the control circuit.

The output of the inverting amplifier can be connected to a serial connection of a resistor and a further capacitor, which serial connection is coupled in parallel to the capacitor. This can influence the characteristics of the signal that is created as a mix of the output from the inverter and amplifier and from the constant current generators placed inside the integrated circuit. These components generate the automatic change between normal frequency-mode and charge-mode.

The invention can also be described as a method for power conversion control in serial resonance switch mode power converters operating in frequency mode at normal operation where a first feedback signal, from the output, is converted to an input to switching means where a second feed back signal is used to influence the charging and discharging of at least one capacitor connected to the oscillating circuit, where by increasing load, the mode of operation is changed into a charge mode control by a second feedback signal, which second feedback signal is based on the actual charging current and thereby change in charge in each half period of switching on the serial resonant capacitor(s), Cp,Cp'.

In this way, it is achieved that the start-up of the power converter takes place as usual in frequency mode, and where light load operation also takes place in this mode. However, if the load increases, an automatic change in the direction of operation in charge mode takes place where a voltage change on the serial resonant capacitor(s), depending on the actual current demand of the output, is used as the feedback signal to the control circuit. Full-time operation in charge mode could be critical because power supplies might have problems with starting in charge mode as no feedback signal occurs in the start-up situation and might have problems with stability in light load. This problem is completely solved by letting the start and light load take place in frequency mode, and only use charge mode operation if the output current increases. Under normal operation, a combination of frequency mode and charge mode is possible where direct charge mode operation only takes place at high load.

Normal frequency control gives a strong un-linear conversion, which is known from the state of the art. Charge mode has a better linearity, but at low load, it still has a quite un-linear conversion. Combined frequency control and charge mode, which is described in this patent application, is highly linear at any load.

In the following, the invention is described according to drawings, where.

Figure 1:
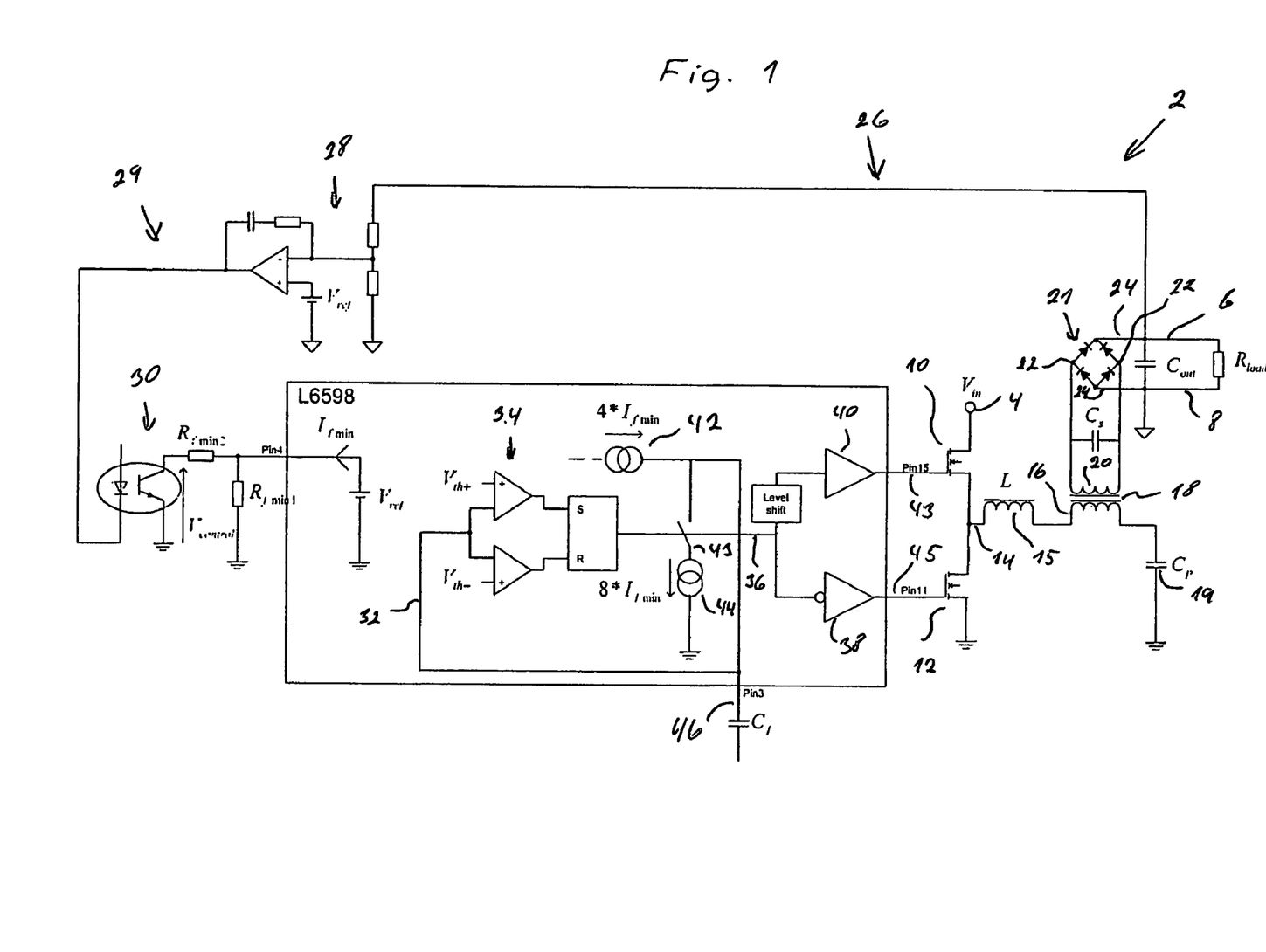
FIG. 1 shows a diagram of one possible embodiment from state of the art.

FIG. 1 describes a switch mode power supply 2 having a power input terminal 4 primarily for DC-power, and output terminals 6, 8 between which the power supply can deliver DC-power. Semiconductor switches 10, 12 are connected so that if switch 10 is open, switch 12 is closed. Hereby, the voltage at the connection point 14 between the two semiconductor switches 10, 12 changes from zero and up to the input DC-voltage. The point 14 is connected to a first coil 15 from where current is flowing to a coil 16, which is part of a transformer 18. The coil 15 can be an integrated part of the transformer 18. The coil 16 is further connected to a capacitor 13,19. The capacitor 13,19 can be used alone or both. The transformer 18 contains further a coil 20, which is connected to rectifier means, which can be formed as a bridge rectifier 21 having an input terminal 22. A rectified DC power is delivered at the output 24 towards the output terminals 6,8 between which a capacitor C-out and a resistor R-load are shown. A feedback signal 26 is connected to the output terminal 6. The feedback signal 26 is sent to an error amplifier 28. The now converted feedback signal 29 is led forwards to electrical isolation means 30 which in practice is in the form of an optocoupler. This optocoupler is connected to a pin 4 of the integrated circuit L6598. Inside the integrated circuit 4 is an internal power supply comprising a voltage reference connected to the pin 4. Outside the integrated circuit is the optocoupler connected to the pin 4 through a serial resistor. Also connected to the pin 4 a resistor is connected to the earth connection. In this way, all currents between two levels can be generated to flow from the pin 4 depending on the collector voltage. on the transistor in the optocoupler 30. In this way, the feedback signal level defines the current. A current change in the pin 4 leads to a change in size of the current in the constant current generators 42, 44. This leads to a change of the charging and the de-charging speed of the capacitor 46. Hereby, the oscillating frequency is over the switching means 10, 12 and the coil 15. The coil 16 at the transformer and the capacitors 13,19 is changed according to the load. A switching means 41 defines which of the constant current generators 42, 44 that are to be active. Both cannot be active at the same time. The common output from the two constant current generators 42, 44 is led through a pin 3 at the integrated circuit. Outside the pin 3 a capacitor 46 is connected. Charging a capacitor 46 by a constant current leads to a linear increase or decrease in voltage over the capacitor 46. In this way, a three-angle voltage is generated at the pin 3 of the integrated circuit. This signal with a three-angle voltage is over a line 32 led to the input of two comparators and a flip-flop. The output flip-flop 36 is switching its output depending on the input of the terminal 32 and on a reference voltage. The output of the flip-flop 36 is connected to driving means 38, 40. Output terminals at the integrated circuit are pin 11 and pin 15. Pin 11 has the number 45 and pin 15 the number 43. These are connected to the input of the semiconductor switching means 10, 12.

In FIG. 1, an apparatus operating in frequency mode is described. In all situations, there is no option for changing to another mode of operation. In most situations, this way of operation is sufficient, but we have a highly unlinear control from Vcontrol 31 to power transferred to Rload 6,8, FIG. 4 and FIG. 5a.

Figure 2:
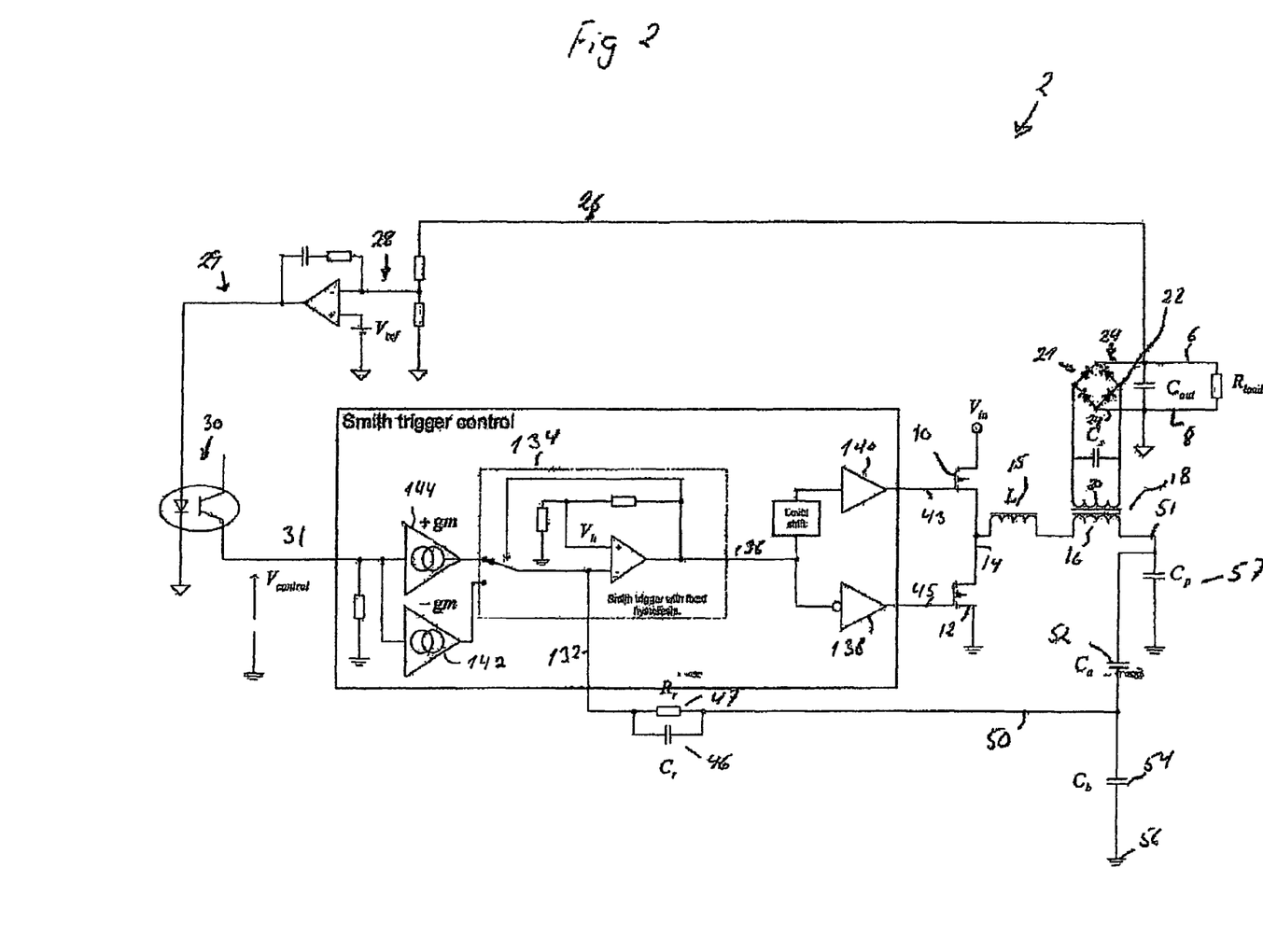
FIG. 2 shows a first embodiment of the invention.

FIG. 2 shows a second embodiment according to the invention. FIG. 2 is using a Smith trigger control circuit. From the switching means 10,12 through the coil 15 to the optocoupler the circuit is similar to FIG. 1. Instead the concentration is on the changes that are made. From the transformer 18 connected at 51 at the connection between the coil 16 as part of the transformer 18 and the capacitor 13,19, a capacitor 52 is connected. This capacitor 52 is further connected to a capacitor 54, which is further connected to the earth connection 56. From the main point between the capacitor 52 and 54, a feedback line 50 is connected This feedback line is now further connected to the capacitor Cr and resistor Rr designated as 46,47 and connected to the negative input of a smith trigger. L6598 is replaced with a smith trigger control circuit 134. The optocoupler 30 is connected to the smith trigger control circuit 134 with two voltage controlled current generators 142,144. Depending on the output of the smith trigger, Cr 46 is charged or de-charged with the current controlled by the output of the optocoupler. If Cr 46 was connected to the ground without the feedback 50 and Rr 47, we have normal frequency control. The smith trigger output 136 is connected to driving means 138, 140 that is connected to switching means 10, 12. In operation, the three-angle voltage at the capacitor 46 is now receiving influence from the voltage on Cp,Cp' 13,19 which depends on the current flowing through the coil 15. The current flowing through the coil 15,16 depends on the current of the transformer 18 and as such also on the current flowing in the coil 20. The current in the coil 20 depends on the size of the load connected to the output terminals 6,8. In this way, the signal picked up at the point 51 depends on the load of the output terminals. This signal is over the line 50 added to the voltage over the capacitor 46. In this way, the charging of the Cp 19 is used as a feedback signal, and if Cr 46 was removed and Rr 47 was alone, this power supply would operate in charge mode. Charge mode is a critical mode of operation in that the power supply in charge mode and light load the gain change. With Cr 46 connected by a combination where normal frequency mode is obtained at light load, and by increasing load, a soft change to charge mode takes place, and by extreme high load, the charge mode is fully taken over by the control of the power supply.

Figure 3:
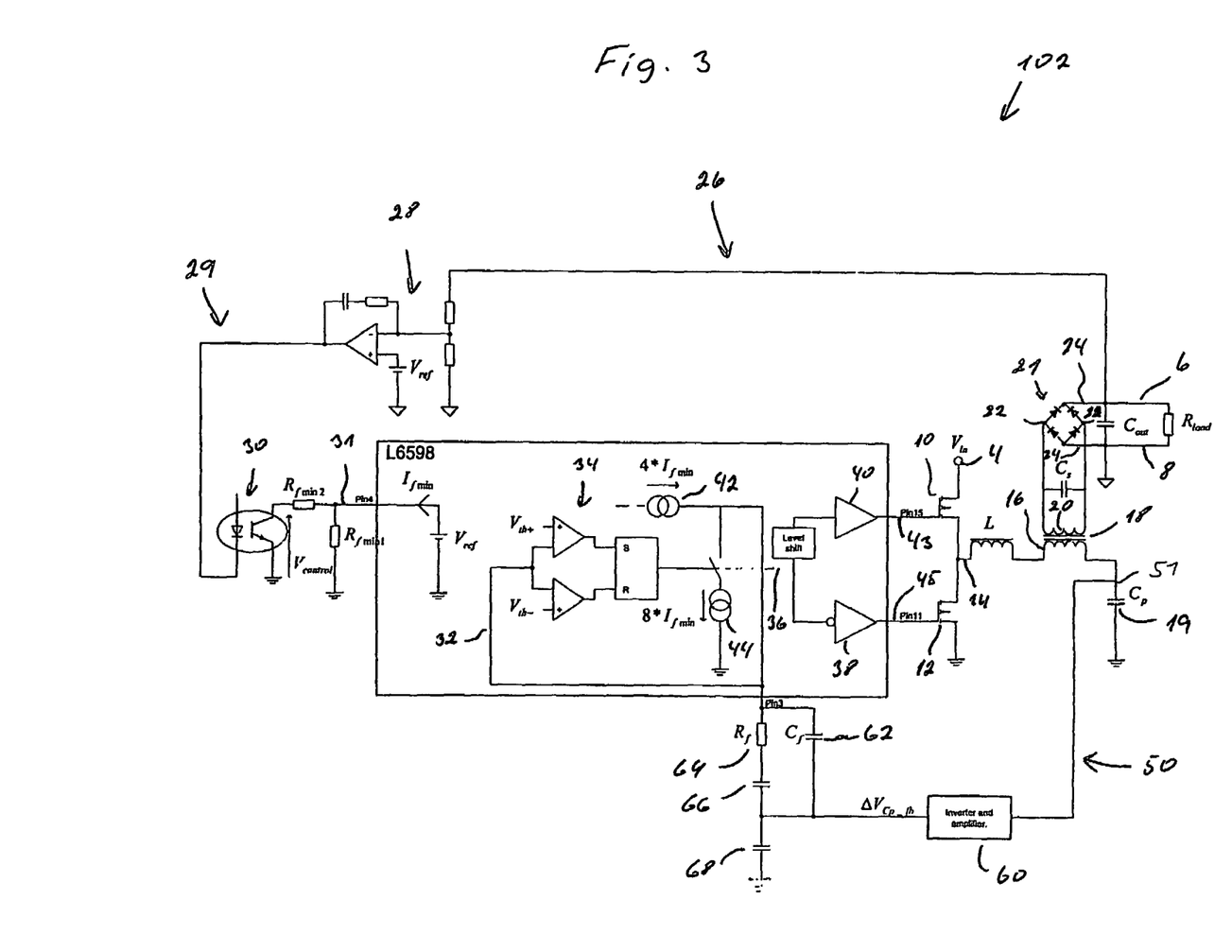
FIG. 3 shows a further embodiment of the invention.

FIG. 3 partly contains the same circuit as described in FIG. 1, but is modified according 30 to FIG. 2 in that the second feedback circuit is now changed to another way of operation. Now, the second feedback circuit 50 contains an inverter and amplifier circuit 60, which is necessary if L6598 have to be used. The output of this inverter and amplifier 60 is connected through a capacitor 62 and a resistor 64 to the pin 3 of L6598, which is connected to an oscillator part of the control circuit 34. In parallel to the capacitor 62, a resistor 64 and a capacitor 66 are connected in serial. Furthermore, from the common point of the capacitor 66, the capacitor 62 and the output from the inverter and amplifier 60 are connected to a capacitor 68, which is connected to the earth connection.

In operation, the inverter and amplifier circuit 60 is able to change the shape of the signal 50 into a signal shape that much better can be added to the signal generated by the capacitor 62 and resistor 64 which are connected to the pin 3 of the integrated circuit. An adjustment of the signal is possible by the parallel coupling of the resistor 64 and the capacitor 62, and the further capacitor 68 is connected to the earth connection in changing the size of the components. The resistor 64 and the capacitor 66 are forming a high pass filter, which has an impedance close to 64 in the whole operating area of the converter. The capacitor 66 is only a DC separation capacitor. In this way, the impedance of 62, 64, 66 is close to 64 at low frequency operation and close to 62 at high frequency operation. This gives charge mode control at high load and frequency mode at low load and a soft change between the two modes.

FIG. 4 shows the power conversion dependency of frequency. It is clearly seen that the gain of a normal frequency controlled series or series parallel resonance converter is strongly unlinear.

Figure 5:
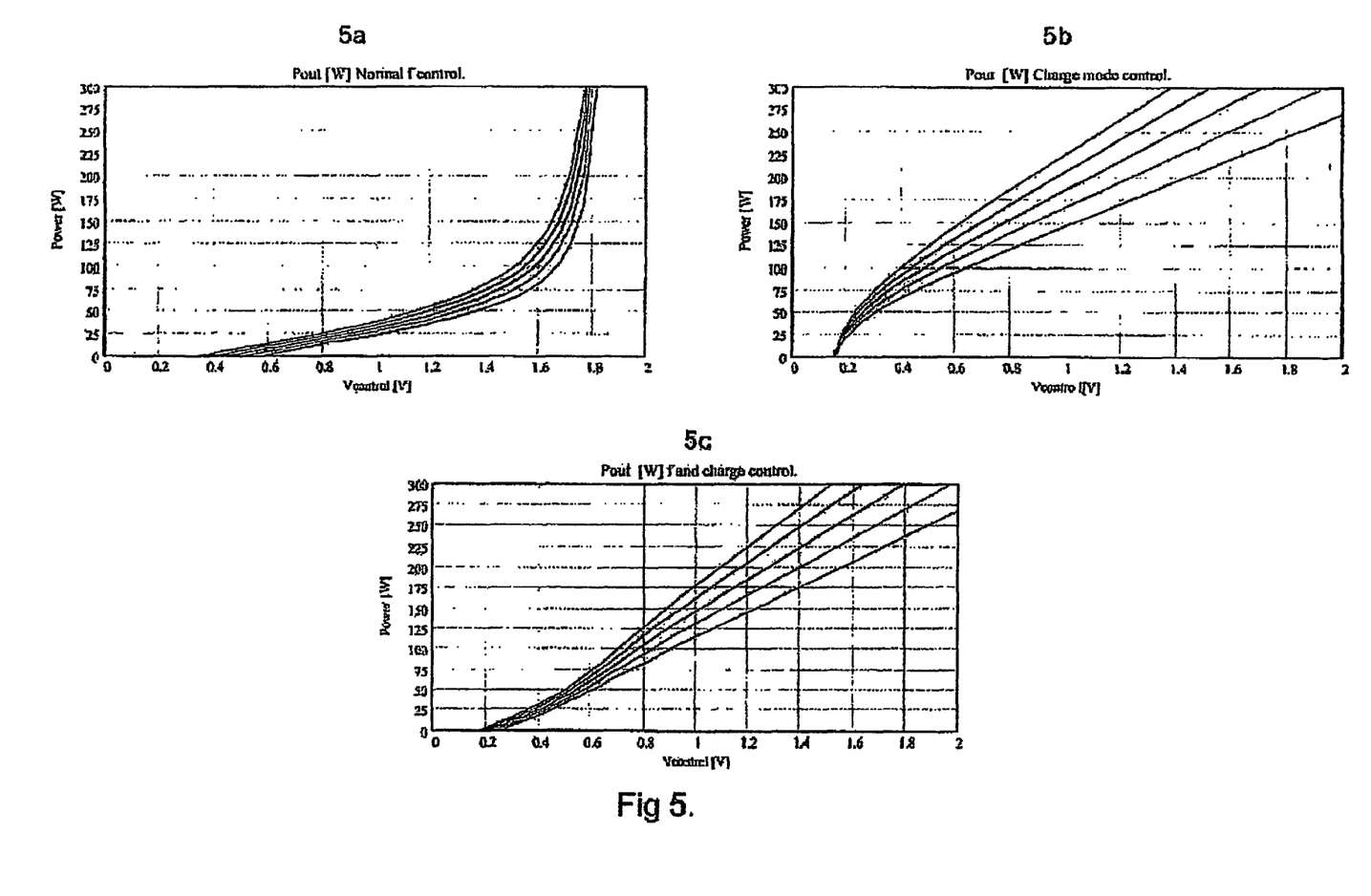
FIG. 5 shows the linearization with charge mode control and the advantage of the combination of charge mode control and frequency control.
Figure 6:
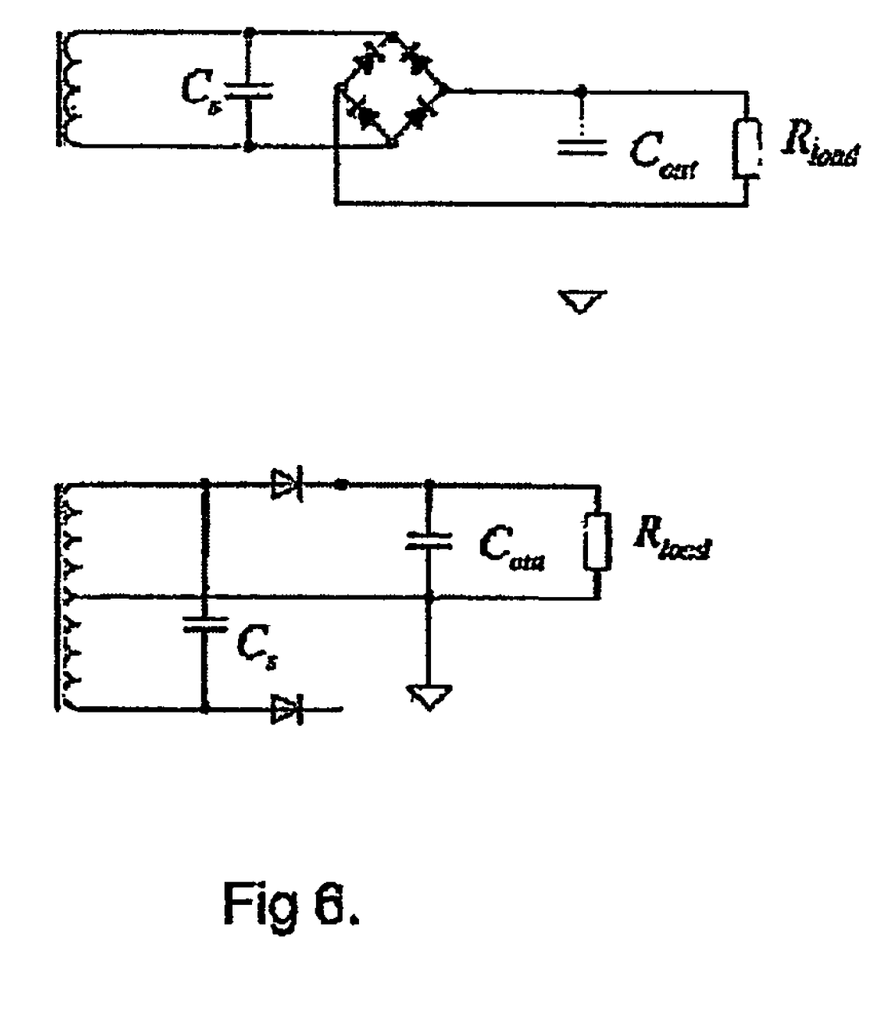
FIG. 6 shows two embodiments of output rectifier means.

FIG. 5 shows a typical regulation of power to the load from Vcontrol when using normal frequency control 5a, pure charge mode control 5b and a mix of frequency and charge mode control 5c.

The invention claimed is:

1. Apparatus for converting power from a power input to an output power supply, the apparatus comprising:
a resonance converter, the resonance converter comprising at least two serial coupled semiconductor switches, wherein:
the semiconductor switches comprise at least one common output terminal, the one common output terminal is connected to at least one first coil,
the first coil is connected to a second coil,
the second coil is connected to a first capacitor,
the second coil is part of a transformer,
the transformer comprises a third coil connected to rectifier means, the rectifier means has its output connected to output terminals,
a first feedback circuit connects one of the output terminals to an error amplifier,
the error amplifier is connected to a first input terminal of a control circuit,
the control circuit comprises an output that is connected over driver means to an input of the semiconductor switches,
a second feedback circuit, the second feedback circuit comprises at least one second capacitor connected to a second input terminal of the control circuit,
the second feedback circuit is connected to a capacitive divider including a third capacitor and a fourth capacitor in series, the fourth capacitor is connected to common ground and the third capacitor is connected to the first capacitor, wherein the midpoint of the capacitive divider is connected to a further capacitor and resistor in parallel connected to the second feedback circuit, and the second feedback circuit transmits a feedback signal from the first capacitor, the first capacitor is serially connected to the second coil and to ground, the second capacitor controls a switching frequency of the semiconductor switches, the second feedback circuit transmits the feedback signal depending on an actual change of charge of the first capacitor in each half period of switching of the first capacitor, and the feedback signal linearizes the influence of the first feedback circuit.

2. Apparatus for converting power from a power input to an output power supply, the apparatus comprising:

a resonance converter, the resonance converter comprising at least two serial coupled semiconductor switches, wherein:

the semiconductor switches comprise at least one common output terminal, the one common output terminal is connected to at least one first coil, the first coil is connected to a second coil, the second coil is connected to a first capacitor, the second coil is part of a transformer, the transformer comprises a third coil connected to rectifier means, the rectifier means has its output connected to output terminals, a first feedback circuit connects one of the output terminals to an error amplifier, the error amplifier is connected to a first input terminal of a control circuit, the control circuit comprises an output that is connected over driver means to an input of the semiconductor switches, a second feedback circuit, wherein the second feedback circuit comprises at least one second capacitor connected to a second input terminal of the of the control circuit, wherein the second feedback circuit comprises an inverting amplifier, and an output of the inverting amplifier is connected to the second input terminal through the second capacitor.

3. Apparatus according to claim 2, wherein the output from the inverting amplifier is connected to a serial connection of a second resistor and a further fifth capacitor to a sixth capacitor, which is connected to common ground, and the serial connection of the second resistor and the fifth capacitor is coupled in parallel to the second capacitor.

\* \* \* \* \*